(12) United States Patent
Gormley

(10) Patent No.: US 10,830,177 B2
(45) Date of Patent: Nov. 10, 2020

(54) ARTICULATING PIVOT POINT POST-EXIT THRUST REVERSER

(71) Applicant: ROHR, INC., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 274 days.

(21) Appl. No.: 15/968,404

(22) Filed: May 1, 2018

(65) Prior Publication Data

US 2019/0338726 A1    Nov. 7, 2019

(51) Int. Cl.
*F02K 1/60*    (2006.01)

(52) U.S. Cl.
CPC .......... *F02K 1/60* (2013.01); *F05D 2220/323* (2013.01)

(58) Field of Classification Search
CPC ... F02K 1/60; F02K 1/605; F02K 1/62; F02K 1/625; F02K 1/70; F02K 1/72
See application file for complete search history.

(56) References Cited

U.S. PATENT DOCUMENTS

| 2,943,444 | A | * | 7/1960 | Baxter | ..................... F02K 1/383 239/265.17 |
| 2,976,681 | A | * | 3/1961 | Pearson | ..................... F02K 1/48 239/265.29 |
| 3,604,662 | A | | 9/1971 | Nelson, Jr. et al. | |
| 4,147,027 | A | | 4/1979 | Greathouse | |
| 4,212,442 | A | | 7/1980 | Fage | |
| 4,410,152 | A | | 10/1983 | Kennedy et al. | |
| 4,422,605 | A | | 12/1983 | Fage | |
| 5,794,433 | A | | 8/1998 | Peters et al. | |
| 5,875,995 | A | | 3/1999 | Moe et al. | |
| 6,170,255 | B1 | | 1/2001 | Gonidec et al. | |
| 8,002,217 | B2 | | 8/2011 | Sternberger | |
| 8,015,797 | B2 | | 9/2011 | Lair | |
| 8,051,639 | B2 | | 11/2011 | Lair | |
| 8,091,827 | B2 | | 1/2012 | Lair | |
| 8,434,715 | B2 | | 5/2013 | Lair | |
| 2003/0218094 | A1 | * | 11/2003 | Lair | ........................ F02K 1/766 244/110 B |
| 2007/0267539 | A1 | | 11/2007 | Bulin | |
| 2008/0083210 | A1 | | 4/2008 | Sternberger et al. | |
| 2009/0193789 | A1 | * | 8/2009 | Pero | ......................... F02K 1/70 60/226.2 |

(Continued)

FOREIGN PATENT DOCUMENTS

| EP | 0717184 | 6/1996 |
| EP | 763653 | 3/1997 |

(Continued)

OTHER PUBLICATIONS

European Patent Office, European Search Report dated Sep. 10, 2019 in Application No. 19168259.0.

(Continued)

*Primary Examiner* — Andrew H Nguyen
(74) *Attorney, Agent, or Firm* — Snell & Wilmer L.L.P.

(57) ABSTRACT

A thrust reverser may comprise a frame, a first reverser door being movable relative to the frame, and a second reverser door being movable relative to the frame and rotationally movable relative to the first reverser door via a first pivot point, the first pivot point being movable relative to the frame via a first link rotationally mounted to the frame via a second pivot point.

17 Claims, 7 Drawing Sheets

(56) References Cited

U.S. PATENT DOCUMENTS

2014/0239084 A1    8/2014   Chandler et al.

FOREIGN PATENT DOCUMENTS

| EP | 1903205 | 3/2008 |
| GB | 1254829 | 11/1971 |
| WO | 2011014250 | 2/2011 |
| WO | 2019164557 | 8/2019 |

OTHER PUBLICATIONS

ESPACENNET, Machine Translation of European reference EP0717184 printed on Dec. 9, 2019.

* cited by examiner

ARTICULATING PIVOT POINT POST-EXIT THRUST REVERSER

FIELD

The present disclosure relates generally to aircraft thrust reversers used with gas turbine engines and, more particularly, to post-exit pivot door thrust reversers.

BACKGROUND

Turbofan gas turbine engines are known to include a fan section that produces a bypass airflow for providing the majority of engine propulsion and a core engine section through which a core airflow is compressed, mixed with fuel, combusted and expanded through a turbine to drive the fan section. In a mixed flow turbofan engine, the cool bypass airflow is ducted between a surrounding nacelle and an outer casing of the core engine section and mixed with a hot exhaust stream from the core engine section prior to discharge from the engine nozzle in a combined or mixed exhaust stream. The surrounding nacelle may include a thrust reverser capable of redirecting the mixed exhaust stream from a rearward direction to, at least partially, a forward direction thus producing a rearward thrust that may serve to decelerate forward motion of an aircraft and thereby assist braking the aircraft upon landing. Pivot door thrust reversers may be used with turbofan gas turbine engines for aircraft, including for corporate or business jets. Pre-exit pivot door thrust reversers may generally be characterized as including thrust reverser doors having trailing edges positioned forward of the exit plane of an exhaust duct, while post-exit pivot door thrust reversers may generally be characterized as including thrust reverser doors having trailing edges that form at least a portion of the exit plane of an exhaust duct.

SUMMARY

A thrust reverser is disclosed, comprising a frame, a first reverser door being movable relative to the frame, and a second reverser door being movable relative to the frame and rotationally movable relative to the first reverser door via a first pivot point, the first pivot point being movable relative to the frame via a first link rotationally mounted to the frame via a second pivot point.

In various embodiments, the first reverser door and the second reverser door rotate in opposite directions to one another about the first pivot point in response to the first reverser door and the second reverser door being moved between a stowed position and a deployed position.

In various embodiments, the first pivot point moves in an aft direction in response to the first reverser door and the second reverser door being moved from the stowed position to the deployed position.

In various embodiments, the second reverser door is moveable relative to the frame via a third pivot point, the third pivot point being moveable relative to the frame via a second link rotationally mounted to the frame via a fourth pivot point.

In various embodiments, the first link extends between the first door and the frame.

In various embodiments, the second link extends between the second door and the frame.

In various embodiments, the second pivot point is located aft of the fourth pivot point.

In various embodiments, the thrust reverser defines a central axis, wherein the second pivot point is spaced a first offset distance from the central axis and the fourth pivot point is spaced a second offset distance from the central axis and wherein the first offset distance is less than or equal to the second offset distance.

In various embodiments, the thrust reverser further comprises a panel coupled to the frame and disposed between the first reverser door and the second reverser door, wherein the panel is disposed outward from the frame with respect to a central axis of the thrust reverser, and the panel is flush with the first reverser door and the second reverser door in response to the thrust reverser being in a stowed position.

A thrust reverser is disclosed, comprising a frame, a first reverser door being moveable relative to the frame, and a second reverser door being moveable relative to the frame, wherein, in response to the thrust reverser moving from a stowed position to a deployed position, the first reverser door rotates about a first pivot point, the second reverser door rotates about the first pivot point, and the first pivot point moves aft with respect to the frame.

In various embodiments, in response to the thrust reverser moving from the stowed position to the deployed position the first reverser door rotates about the first pivot point in a first rotational direction, the second reverser door simultaneously rotates about the first pivot point in a second rotational direction opposite the first rotational direction, and the first pivot point simultaneously moves aft with respect to the frame.

In various embodiments, the thrust reverser further comprises a first link, wherein a first end of the first link is pivotally coupled to the frame and configured to rotate about a second pivot point with respect to the frame, and a second link, wherein a first end of the second link is pivotally coupled to the frame and configured to rotate about a fourth pivot point with respect to the frame, wherein the first reverser door is pivotally coupled to a second end of the first link and configured to rotate with respect to the first link about the first pivot point, and wherein the second reverser door is pivotally coupled to a second end of the second link and configured to rotate with respect to the second link about a third pivot point.

In various embodiments, the first pivot point moves aft with respect to the frame in response to the first link rotating with respect to the frame.

In various embodiments, the second pivot point is located aft of the fourth pivot point.

In various embodiments, the first pivot point comprises a first floating pivot point.

In various embodiments, the third pivot point comprises a second floating pivot point.

In various embodiments, the thrust reverser further comprises a first pair of links, the first pair of links including the first link, and a second pair of links, the second pair of links including the second link.

In various embodiments, the frame comprises an annular structure and opposing beams extending from the annular structure, wherein the first reverser door is mounted to the opposing beams.

In various embodiments, the thrust reverser further comprises a link pivotally coupled to the frame, wherein the link extends between the frame and the first reverser door and the second reverser door, the first pivot point moves aft in response to the link rotating with respect to the frame.

A method for manufacturing a thrust reverser is disclosed, comprising coupling a first link to a frame, wherein the first link pivots about a second pivot point with respect to the frame, coupling a second link to the frame, wherein the second link pivots about a fourth pivot point with respect to the frame, coupling a first reverser door to the first link, wherein the first reverser door pivots about a first pivot point with respect to the first link, coupling a second reverser door to the first link, wherein the second reverser door pivots about the first pivot point with respect to the first link, and coupling the second reverser door to the second link, wherein the second reverser door pivots about a third pivot point with respect to the second link.

In various embodiments, the method further comprises coupling the first reverser door to a first actuator, and coupling the second reverser door to a second actuator.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In various embodiments, a thrust reverser, as provided herein, may include reverser doors that translate aft as they move from a stowed position to a deployed position. A thrust reverser, as provided herein, may be able to fit within shorter duct loft lines without sacrificing distance between a nozzle exit and the thrust reverser doors. A thrust reverser, as provided herein, may provide enhanced reverser efficiency, tailorable efflux, and capability of modifying performance parameters independently.

Figure 1:
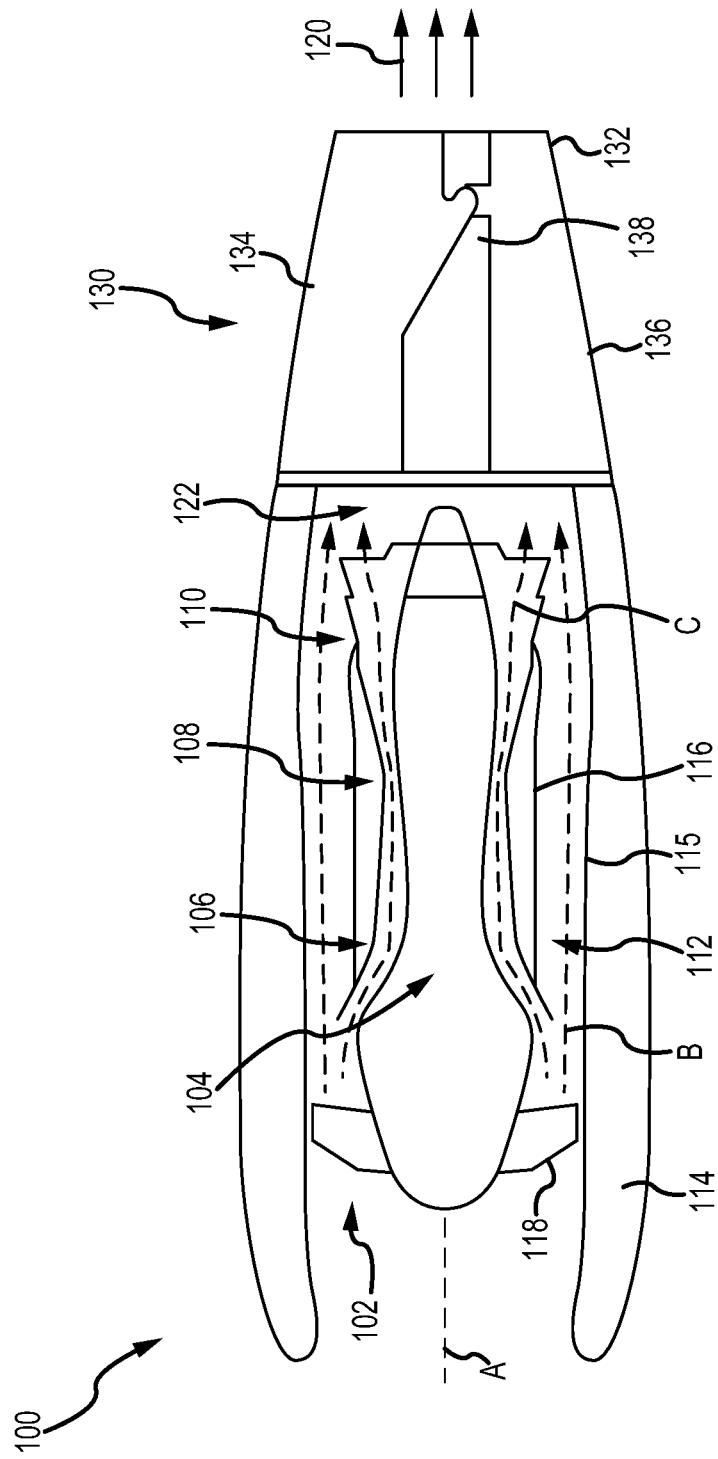
FIG. 1 provides a schematic view of a gas turbine engine, in accordance with various embodiments.

Referring now to the drawings, FIG. 1 schematically illustrates a gas turbine engine 100 of a mixed flow turbofan variety. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

A thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a stowed position (also referred to as a closed position or a retracted position), as illustrated in FIG. 1. The thrust reverser 130 further includes an upper reverser door 134, a lower reverser door 136 and a pair of opposing side beams 138, which may house actuator componentry and connecting members used to open and close the upper reverser door 134 and the lower reverser door 136. As discussed below, thrust reversal is affected by opening the upper reverser door 134 and the lower reverser door 136 to direct all or a portion of the mixed exhaust stream 120 in a direction having an upstream component relative to the central longitudinal axis A of the gas turbine engine 100. The momentum of the upstream component of the mixed exhaust stream 120 exiting the thrust reverser 130 while in an open or deployed position provides the reverse thrust used to decelerate an aircraft upon landing or during a rejected takeoff.

Figure 2A:
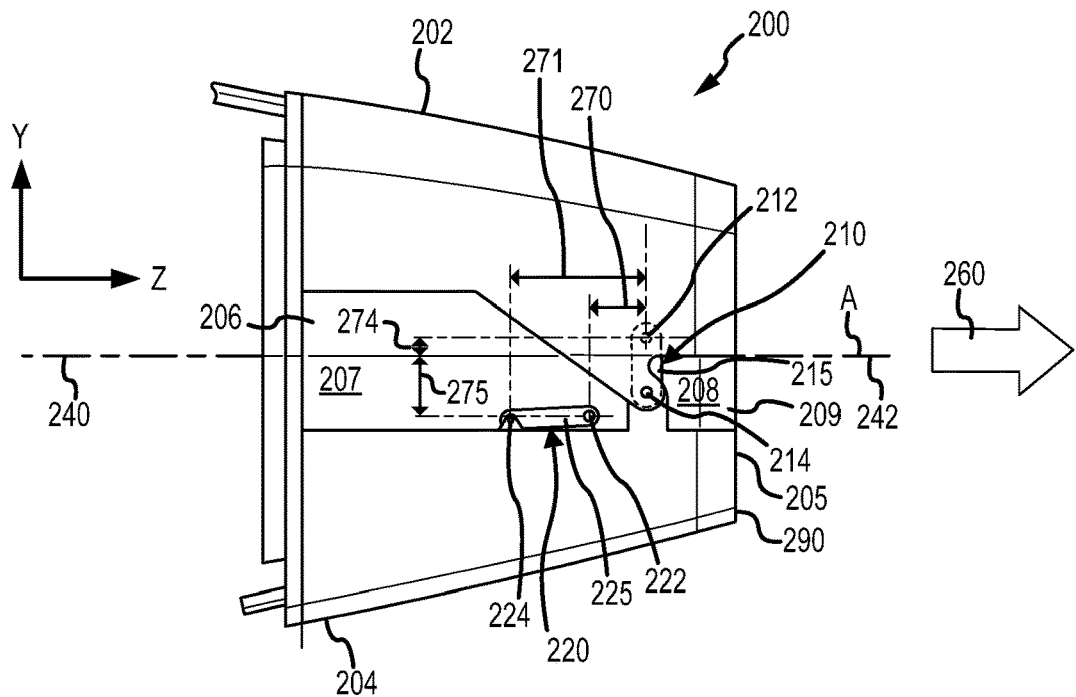
FIG. 2A, FIG. 2B, and FIG. 2C provide schematic views of a thrust reverser in a stowed position, a partially deployed position, and a fully deployed position, respectively, in accordance with various embodiments.
Figure 2B:
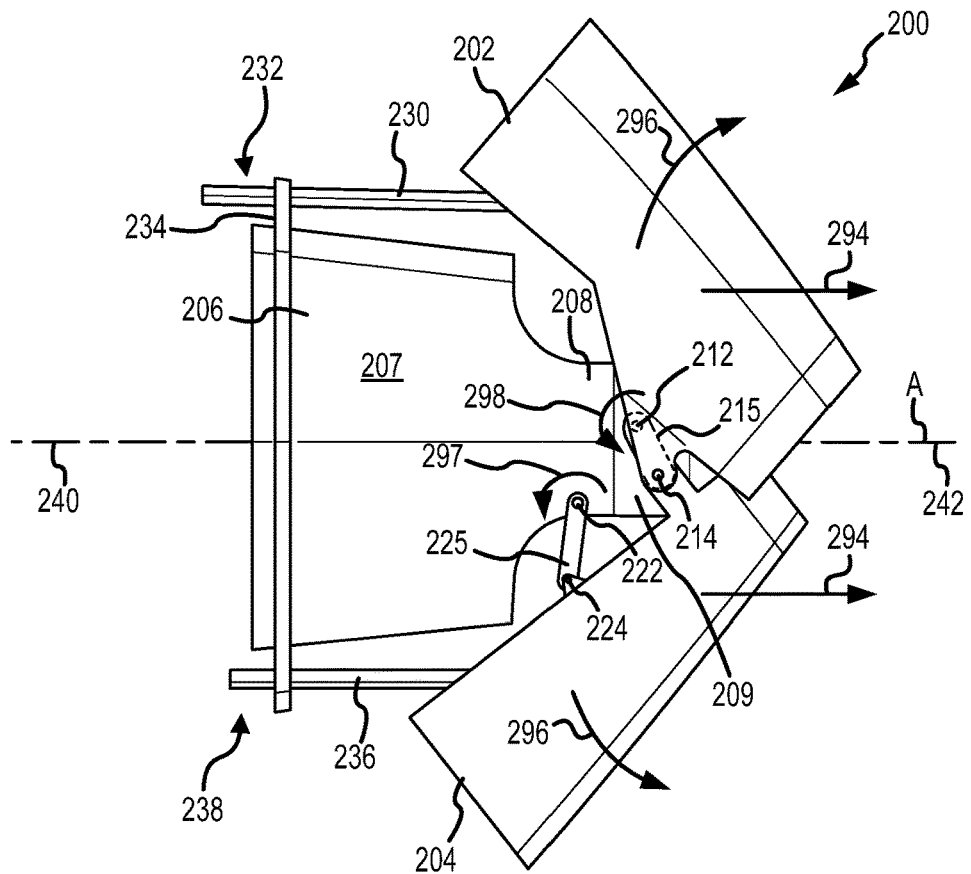
Figure 2C:
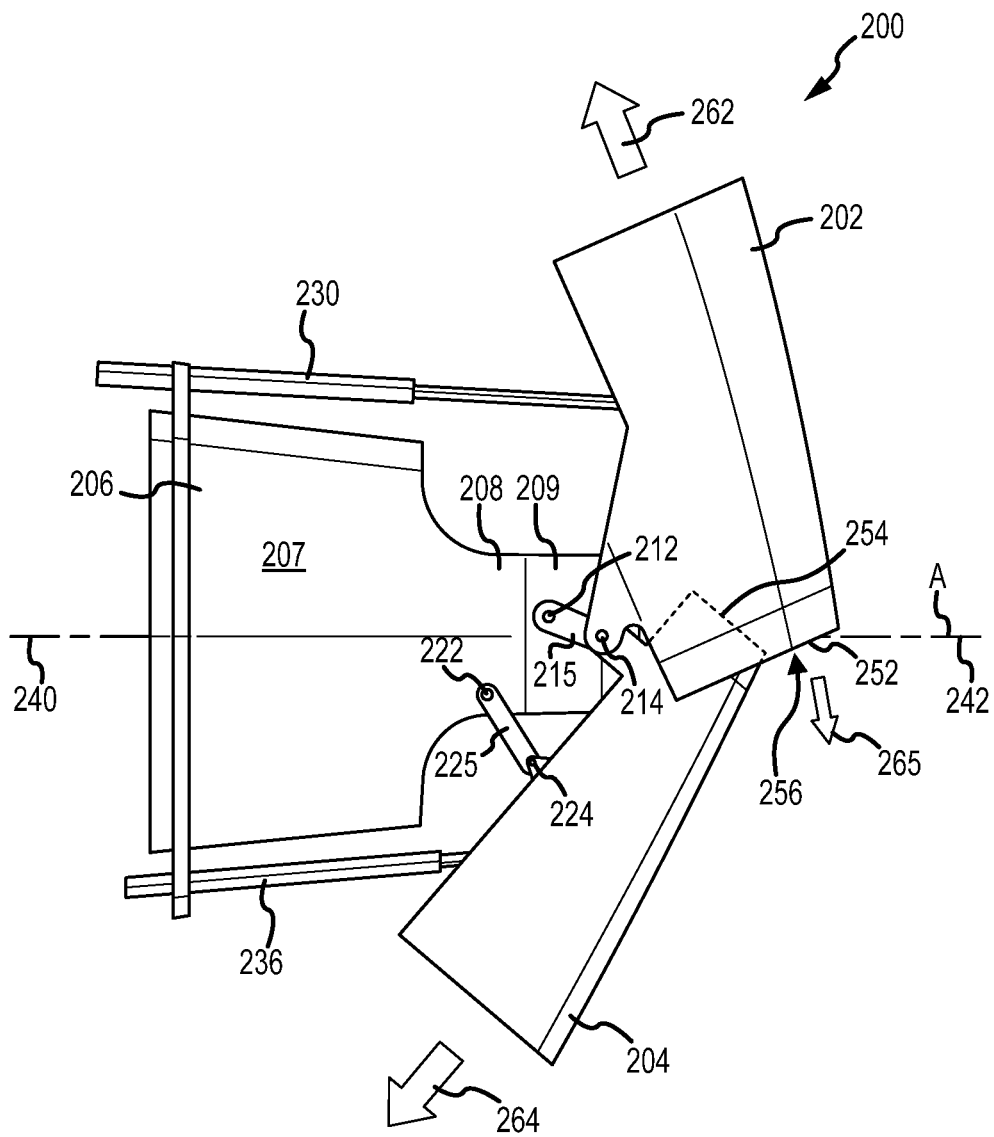

Referring now to FIG. 2A, FIG. 2B, and FIG. 2C, schematic side views of a thrust reverser 200 in a stowed position, partially deployed position, and a deployed position, respectively, are illustrated, in accordance with various embodiments. The thrust reverser 200 includes an upper reverser door 202, a lower reverser door 204, and a frame 206. In various embodiments, the frame 206 includes an annular structure 207 with a pair of opposing side beams 208 extending from the annular structure 207. The pair of opposing side beams 208 may include a port side beam 209 and a starboard side beam (hidden). The pair of opposing side beams 208 may provide a structural support for mounting related components and operating the thrust reverser 200 between deployed and retracted positions. Upper reverser door 202 is moveable relative to frame 206. Lower reverser door 204 is moveable relative to frame 206.

In various embodiments, a first port pivot arrangement (i.e., first pivot arrangement 210) is mounted to the port side beam 209 and a second port pivot arrangement) (i.e., pivot arrangement 220) is mounted to the port side beam 209. Portions of first pivot arrangement 210 covered by upper reverser door 202 are illustrated with hidden lines for clarity purposes. In various embodiments, a first starboard pivot arrangement is mounted to the starboard side beam and a second starboard pivot arrangement is mounted to the starboard side beam. In various embodiments, the first port pivot arrangement may be mounted to an upper portion of the port side beam 209 and the second port pivot arrangement may be mounted to a lower portion of the port side beam 209. In various embodiments, the starboard side pivot assembly and side beam configuration described herein are symmetrical with the port side pivot assembly and side beam configuration described herein. In this regard, although described herein with respect to the port side, it should be understood that the starboard side comprises a similar arrangement as the port side. In this regard, each pivot arrangement may include a pair of opposing links, with a first link on the port side and a second link on the starboard side.

In various embodiments, first pivot arrangement 210, characterized by a fixed pivot point (also referred to herein as a second pivot point) 212 and a floating pivot point (also referred to herein as a first pivot point) 214, may include one or more components mounted to the opposing side beams 208 and may be configured to facilitate rotation of the upper reverser door 202 and the lower reverser door 204 between open or deployed and closed or stowed states within the thrust reverser 200. Furthermore, second pivot arrangement 220, characterized by a fixed pivot point (also referred to herein as a fourth pivot point) 222 and a floating pivot point (also referred to herein as a third pivot point) 224, may include one or more components mounted to the opposing side beams 208 and may be configured to facilitate rotation of the upper reverser door 202 and the lower reverser door 204 between open or deployed and closed or stowed states within the thrust reverser 200. As used herein, the term "fixed pivot point" may refer to an axis of rotation of a pivot arrangement, wherein the position of the axis of rotation is fixed with respect to frame 206, independent of the rotational orientation of the pivot arrangement. As used herein, the term "floating pivot point" may refer to an axis of rotation of a pivot arrangement, wherein the position of the axis of rotation with respect to frame 206 varies dependent upon the rotational orientation of the pivot arrangement.

In various embodiments, first pivot arrangement 210 may comprise a link (also referred to as a crank arm or a swing arm) 215 having a first end pivotally coupled to side beam 208 of frame 206 and a second end pivotally coupled to upper reverser door 202. Link 215 may rotate about fixed pivot point 212. In various embodiments, second pivot arrangement 220 may comprise a link (also referred to as a crank arm or a swing arm) 225 having a first end pivotally coupled to side beam 208 of frame 206 and a second end pivotally coupled to lower reverser door 204. Link 225 may rotate about fixed pivot point 222. Lower reverser door 204 may be pivotally coupled to link 215 whereby lower reverser door 204 may rotate about floating pivot point 214. In this regard, link 215 may be pivotally coupled to both upper reverser door 202 and lower reverser door 204. Stated differently, upper reverser door 202 and lower reverser door 204 may share a common pivot point (i.e., floating pivot point 214).

In various embodiments, a first actuator 230 may have a first end 232 connected to an attachment flange 234 and a second end connected to an inner surface of the upper reverser door 202. Similarly, a second actuator 236 may have a first end 238 connected to the attachment flange 234 and a second end connected to an inner surface of the lower reverser door 204.

In various embodiments, first actuator 230 may extend to rotate upper reverser door 202 between a stowed position (see FIG. 2A) and a deployed position (see FIG. 2C). Similarly, second actuator 236 may extend to rotate lower reverser door 204 between the stowed position and the deployed position. With particular focus on FIG. 2B, as upper reverser door 202 and lower reverser door 204 move between the stowed position and the deployed position, upper reverser door 202 and lower reverser door 204 may simultaneously rotate, illustrated by arrows 296, about floating pivot point 214. Upper reverser door 202 may rotate in a first rotational direction about floating pivot point 214 and lower reverser door 204 may rotate in a second rotational direction about floating pivot point 214, opposite the first rotational direction. Extension of actuator 236 may cause link 225 to rotate, illustrated by arrow 297, about fixed pivot point 222, causing floating pivot point 224 to move in the aft direction. Link 215 may be simultaneously driven to rotate, illustrated by arrow 298, about fixed pivot point 212, causing floating pivot point 214 to move in the aft direction. Upper reverser door 202 and lower reverser door 204 may translate aft, illustrated by arrows 294, in response to link 215 rotating since upper reverser door 202 and lower reverser door 204 are supported by link 215 at floating pivot point 214. In this regard, upper reverser door 202 and lower reverser door 204 may simultaneously translate aft and rotate outwards in response to actuators 230, 236 extending. Moving from the deployed position to the stowed position may be the reverse operation as moving from the stowed position to the deployed position.

In various embodiments, with particular focus on FIG. 2A, the axial offset distance 271, taken along the central axis A, between fixed pivot point 212 and floating pivot point 224 may decrease in response to thrust reverser 200 moving between the stowed position and the deployed position.

Still referring to FIGS. 2A, 2B, and 2C, when the thrust reverser 200 assumes the closed or stowed position, e.g., during flight, the upper reverser door 202 and the lower reverser door 204 are rotated to their closed positions (see FIG. 2A). The outer surfaces of the upper reverser door 202 and the lower reverser door 204 blend with the outer surface of the nacelle, forming a smooth aerodynamic shape of the gas turbine engine. In the same stowed configuration, a mixed gas stream 260 exits the exhaust duct 205 and is generally unaffected by the thrust reverser 200 or its componentry, as the inner surfaces of the upper reverser door 202 and the lower reverser door 204 are blended with the interior surface of the exhaust duct 205 to provide a generally smooth and annular exhaust flow path from downstream of the core engine exhaust to a downstream exit plane or aft end 290 of the thrust reverser 200. While in the stowed position, the mixed gas stream 260 flows out the exhaust duct 205, providing forward thrust necessary to propel the aircraft. When the thrust reverser 200 assumes the open or deployed position, e.g., upon landing, the upper reverser door 202 and the lower reverser door 204 are rotated to their open positions (see FIG. 2C). The mixed gas stream 260 is diverted from the exit of the exhaust duct 205 to form a first stream 262, following an inner surface of the upper reverser door 202 and a second stream 264, following an inner surface of the lower reverser door 204. Both the first stream 262 and the second stream 264 have forward vector components of thrust, which provide the reverse thrust acting on the aircraft.

A central axis A is illustrated extending through the thrust reverser 200. The central axis A may define a fore end or fore direction 240 of the thrust reverser 200 and an aft end or aft direction 242 of the thrust reverser 200. Various embodiments of the disclosure may be described in relation to the central axis A. For example, the upper reverser door 202 may be considered positioned above the central axis A while the lower reverser door 204 may be considered positioned below the central axis A. Similarly, the port side beam 209 may be considered positioned to the port or left side of the central axis A (looking in the fore direction 240) while the starboard side beam may be considered positioned to the right or starboard side of the central axis A (looking in the fore direction 240). More generally, reference to a first reverser door may broadly refer to a reverser door positioned opposite a second reverser door with respect to the central axis A, there being no preferred up or down or side to side orientation, while reference to a first side beam may broadly refer to a side beam positioned opposite a second side beam with respect to the central axis A. As used herein, a first component positioned opposite a second component does not imply the second component is a mirror image of the first component or the second component is positioned symmetrically opposite to the first component, though the disclosure contemplates such mirror image and symmetric configurations and positioning.

Still referring to FIG. 2A, through FIG. 2C, when the thrust reverser 200 assumes the deployed state, as shown in FIG. 2C, an upper trailing edge 252 of the upper reverser door 202 may be positioned and configured to extend aft of a lower trailing edge 254 of the lower reverser door 204. At the same time, the lower trailing edge 254 of the lower reverser door 204 may be positioned and configured to extend further elevated in relation, for example, to the central axis A, than the upper trailing edge 252 of the upper reverser door 202. In other words, the lower trailing edge 254 and the upper trailing edge 252 are positioned relative to one another in the deployed state such that, when viewed along the central axis A, there is minimal to no opening in the axial direction for a leakage component of the exhaust flow to exit the thrust reverser 200 in a direction parallel to the central axis and contribute directly to forward thrust. The resulting configuration may, however, provide a gap 256 between the upper trailing edge 252 and the lower trailing edge 254, and the gap 256 may provide an opening for a spoiled flow 265, but the spoiled flow 265 is directed principally in a vertical direction (or a direction substantially perpendicular to the central axis A), with a minimal vector component in the aft direction, ensuring that the mixed gas stream 260 is diverted almost entirely from exiting exhaust duct 205 to form the upward stream 262 and the downward stream 264. Portions of lower reverser door 204 covered by upper reverser door 202 are illustrated in FIG. 2C with hidden lines for clarity purposes.

In various embodiments, the size of the gap 256 may be advantageously reduced or minimized by offsetting the centers of rotation of fixed pivot point 212 and fixed pivot point 222 by an axial offset distance 270 along the central axis A and a transverse offset distance (i.e., the sum of upper offset distance 274 and lower offset distance 275) perpendicular to the central axis.

With particular focus on FIG. 2A, in various embodiments, fixed pivot point 212 may be spaced an upper offset distance 274 from the central axis A and fixed pivot point 222 may be spaced a lower offset distance 275 from the central axis A, and in a direction opposite the upper offset distance 274. In various embodiments, the upper offset distance 274 is less than the lower offset distance 275. In various embodiments, fixed pivot point 212 is positioned aft of fixed pivot point 222. In various embodiments, fixed pivot point 212 and fixed pivot point 222 are oriented substantially perpendicular to the central axis A. In still other embodiments, one or more of the pivot points are non-perpendicular to central axis A.

Figure 2D:
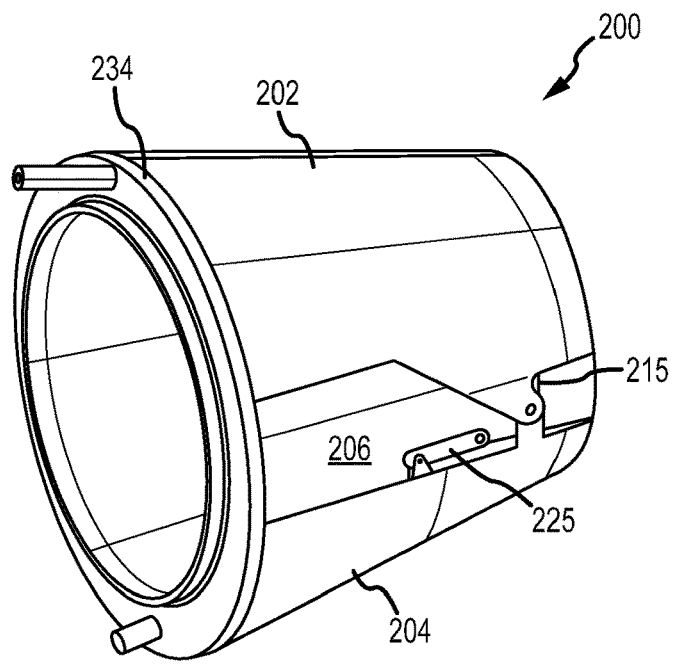
FIG. 2D and FIG. 2E provide schematic perspective views of the thrust reverser depicted in FIG. 2A and FIG. 2C, in a stowed position and a deployed position, respectively, in accordance with various embodiments.
Figure 2E:
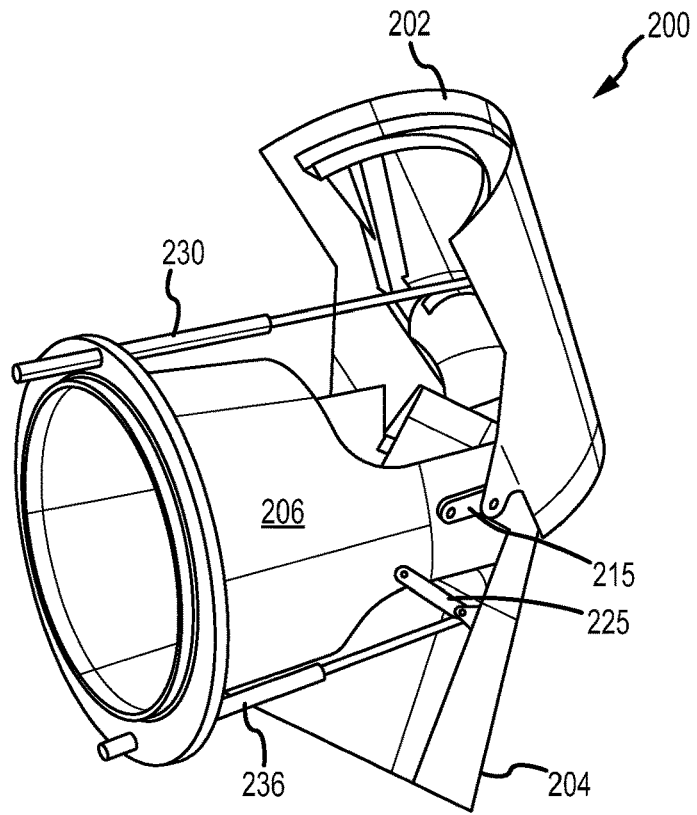

With reference to FIG. 2D and FIG. 2E, perspective views of thrust reverser 200 are illustrated in the stowed position and the deployed position, respectively.

Figure 2F:
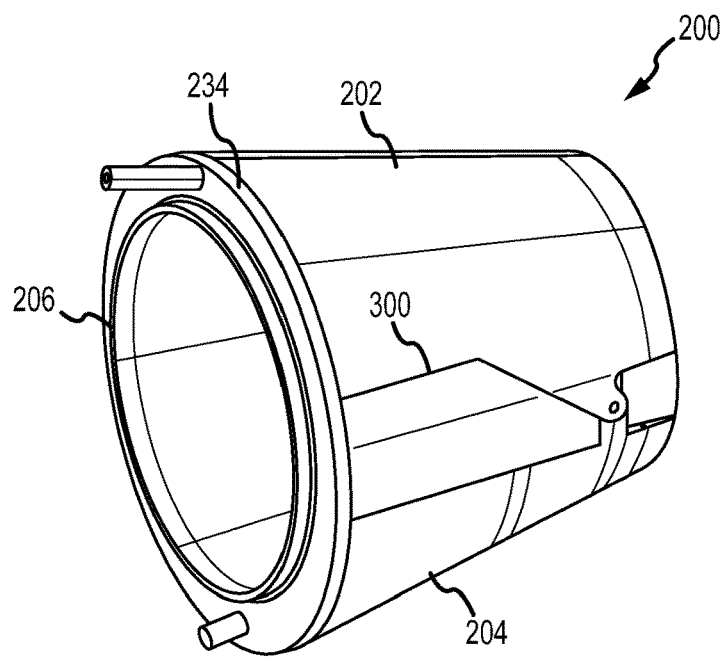
FIG. 2F and FIG. 2G provide schematic perspective views of the thrust reverser depicted in FIG. 2A and FIG. 2C, in a stowed position and a deployed position, respectively, and having a panel coupled to the frame and forming a seamless, aerodynamic outer surface for the thrust reverser, in accordance with various embodiments.
Figure 2G:
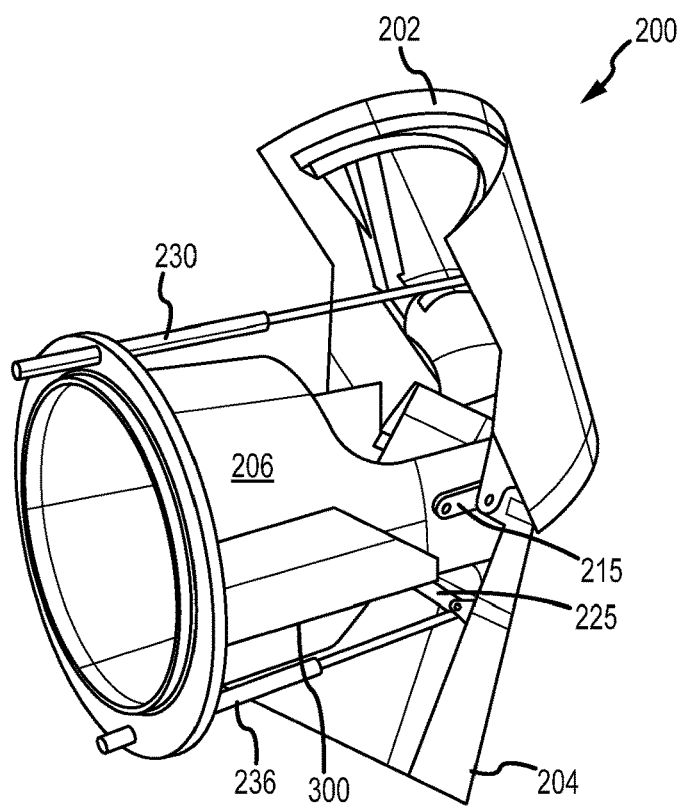

With reference to FIG. 2F and FIG. 2G, perspective views of thrust reverser 200 are illustrated in the stowed position and the deployed position, respectively. Thrust reverser 200 may further include a panel 300 coupled to frame 206. Panel 300 may be positioned between upper reverser door 202 and lower reverser door 204. Panel 300 may be flush with upper reverser door 202 and lower reverser door 204 in response to thrust reverser 200 being in the stowed position (see FIG. 2F). Panel 300 may at least partially cover link 225 (hidden in FIG. 2F). Panel 300 may comprise a curved sheet of material. Panel 300 may be made from a metal, a metal alloy, or a composite material, among others. Panel 300 may be disposed outward from frame 206 with respect to central axis A.

Figure 3A:
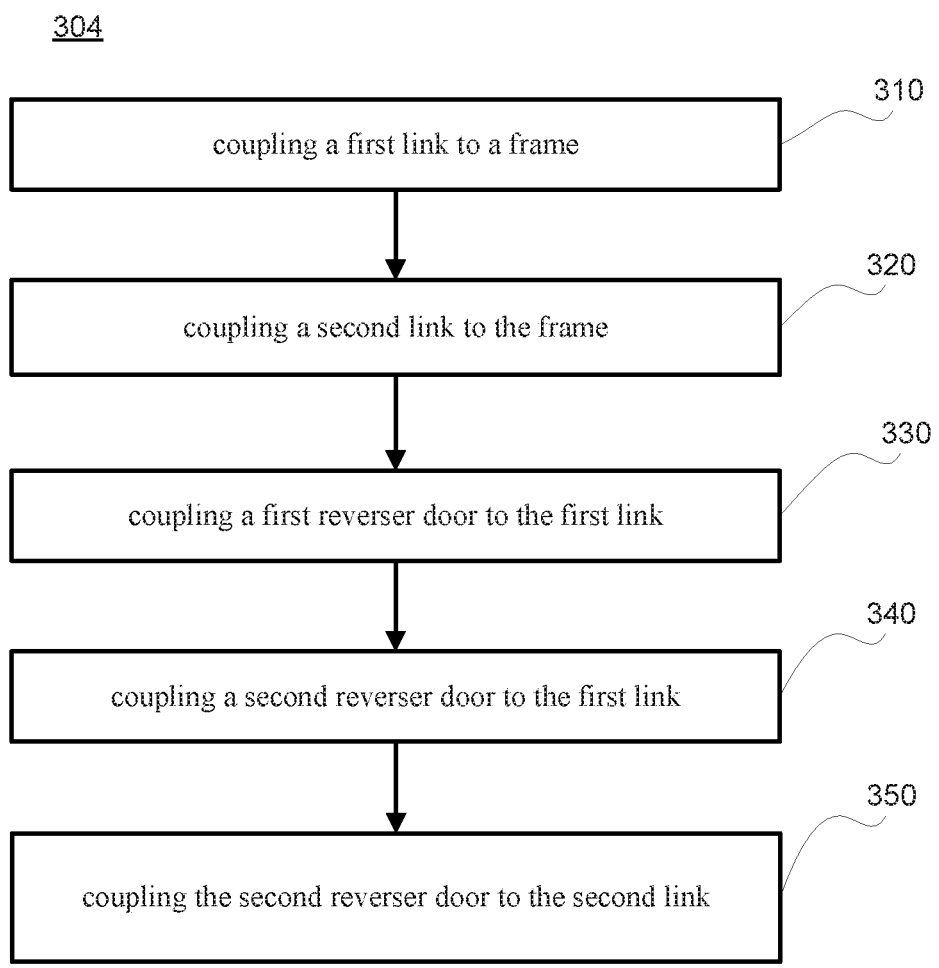
FIG. 3A and FIG. 3B provide a flow chart illustrating a method of manufacturing a thrust reverser, in accordance with various embodiments.
Figure 3B:
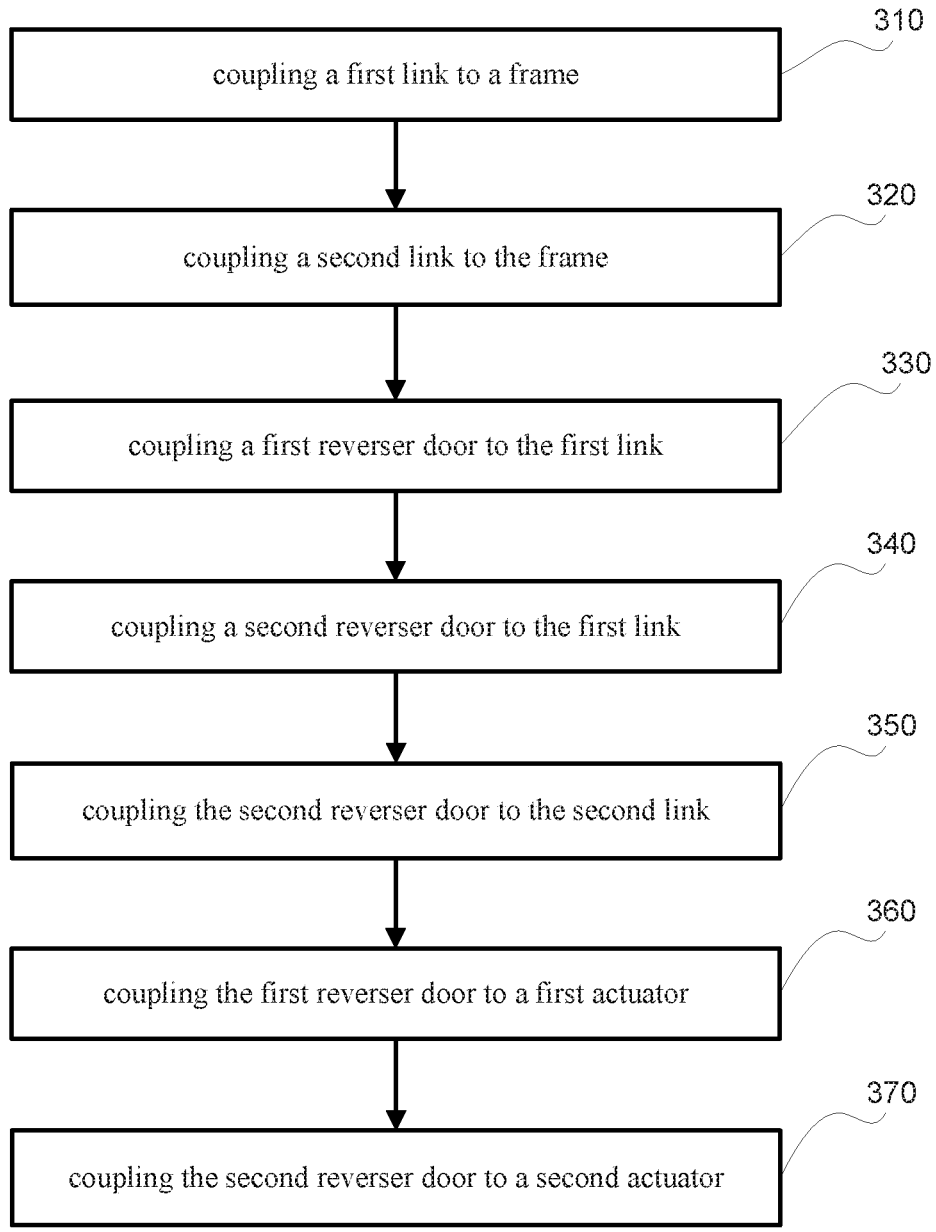

With reference to FIG. 3A, a method 304 for manufacturing a thrust reverser is illustrated, in accordance with various embodiments. Method 304 includes coupling a first link to a frame (step 310). Method 304 includes coupling a second link to the frame (step 320). Method 304 includes coupling a first reverser door to the first link (step 330). Method 304 includes coupling a second reverser door to the first link (step 340). Method 304 includes coupling the second reverser door to the second link (step 350). With reference to FIG. 3B, method 304 may further include coupling the first reverser door to a first actuator (step 360). Method 304 may further include coupling the second reverser door to a second actuator (step 370).

With combined reference to FIG. 3A, FIG. 3B, and FIG. 2C, step 310 may include coupling link 215 to frame 206, wherein link 215 pivots about fixed pivot point 212 with respect to frame 206. Step 320 may include coupling link 225 to frame 206, wherein link 225 pivots about fixed pivot point 222 with respect to frame 206. Step 330 may include coupling upper reverser door 202 to link 215, wherein upper reverser door 202 pivots about floating pivot point 214 with respect to link 215. Step 340 may include coupling lower reverser door 204 to link 215, wherein lower reverser door 204 pivots about floating pivot point 214 with respect to link 215. Step 350 may include coupling lower reverser door 204 to link 225, wherein lower reverser door 204 pivots about floating pivot point 224 with respect to link 225. Step 360 may include coupling upper reverser door 202 to actuator 230. Step 370 may include coupling lower reverser door 204 to actuator 236.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser, comprising;
   a frame;
   a first link rotationally mounted to the frame;
   a first reverser door being movable relative to the frame and rotationally mounted to the first link at a first pivot point; and
   a second reverser door being movable relative to the frame and rotationally mounted to the first link at the first pivot point;
   wherein the first pivot point is movable relative to the frame via the first link, and the first link is rotationally mounted to the frame at a second pivot point,
   the first pivot point comprises a first axis of rotation of the first reverser door and comprises a second axis of rotation of the second reverser door, the first axis of rotation is coaxial with the second axis of rotation, and
   the first reverser door and the second reverser door rotate in opposite directions to one another about the first pivot point in response to the first reverser door and the second reverser door being moved between a stowed position and a deployed position.

2. The thrust reverser of claim 1, wherein the first pivot point moves in an aft direction in response to the first reverser door and the second reverser door being moved from the stowed position to the deployed position.

3. The thrust reverser of claim 2, wherein the second reverser door is moveable relative to the frame via a third pivot point, the third pivot point being moveable relative to the frame via a second link rotationally mounted to the frame via a fourth pivot point.

4. The thrust reverser of claim 3, wherein the first link extends between the first door and the frame.

5. The thrust reverser of claim 4, wherein the second link extends between the second door and the frame.

6. The thrust reverser of claim 3, wherein the second pivot point is located aft of the fourth pivot point.

7. The thrust reverser of claim 3, wherein the thrust reverser defines a central axis, wherein the second pivot point is spaced a first offset distance from the central axis and the fourth pivot point is spaced a second offset distance from the central axis and wherein the first offset distance is less than or equal to the second offset distance.

8. The thrust reverser of claim 1, further comprising a panel coupled to the frame and disposed between the first reverser door and the second reverser door, wherein the panel is disposed outward from the frame with respect to a central axis of the thrust reverser, and the panel is flush with the first reverser door and the second reverser door in response to the thrust reverser being in the stowed position.

9. A thrust reverser, comprising:
   a frame;
   a first reverser door being moveable relative to the frame; and
   a second reverser door being moveable relative to the frame;

wherein, in response to the thrust reverser moving from a stowed position to a deployed position, the first reverser door rotates about a first pivot point, the second reverser door rotates about the first pivot point, and the first pivot point moves aft with respect to the frame, wherein the first pivot point comprises a first axis of rotation of the first reverser door and comprises a second axis of rotation of the second reverser door, the first axis of rotation is coaxial with the second axis of rotation wherein the first reverser door and the second reverser door rotate in opposite directions to one another about the first pivot point in response to the first reverser door and the second reverser door being moved between the stowed position and the deployed position;

a first link, wherein a first end of the first link is pivotally coupled to the frame and configured to rotate about a second pivot point with respect to the frame;

wherein the first reverser door is pivotally coupled to a second end of the first link and configured to rotate with respect to the first link about the first pivot point;

wherein the second pivot point is a fixed pivot point.

10. The thrust reverser of claim 9, wherein, in response to the thrust reverser moving from the stowed position to the deployed position the first reverser door rotates about the first pivot point in a first rotational direction, the second reverser door simultaneously rotates about the first pivot point in a second rotational direction opposite the first rotational direction, and the first pivot point simultaneously moves aft with respect to the frame.

11. The thrust reverser of claim 9, further comprising:
a second link, wherein a first end of the second link is pivotally coupled to the frame and configured to rotate about a fourth pivot point with respect to the frame;
wherein the second reverser door is pivotally coupled to a second end of the second link and configured to rotate with respect to the second link about a third pivot point.

12. The thrust reverser of claim 11, wherein the second pivot point is located aft of the fourth pivot point.

13. The thrust reverser of claim 12, wherein the first pivot point comprises a first floating pivot point and the third pivot point comprises a second floating pivot point.

14. The thrust reverser of claim 11, further comprising:
a first pair of links, the first pair of links including the first link; and
a second pair of links, the second pair of links including the second link.

15. The thrust reverser of claim 9, wherein the first pivot point moves aft with respect to the frame in response to the first link rotating with respect to the frame.

16. The thrust reverser of claim 9, wherein the frame comprises an annular structure and opposing beams extending from the annular structure, wherein the first reverser door is mounted to the opposing beams.

17. A thrust reverser, comprising:
a frame;
a first reverser door being moveable relative to the frame;
a second reverser door being moveable relative to the frame;
a first link, wherein a first end of the first link is pivotally coupled to the frame and configured to rotate about a second pivot point with respect to the frame; and
a second link, wherein a first end of the second link is pivotally coupled to the frame and configured to rotate about a fourth pivot point with respect to the frame;
wherein the first reverser door is pivotally coupled to a second end of the first link and configured to rotate with respect to the first link about a first pivot point,
the second reverser door is pivotally coupled to a second end of the second link and configured to rotate with respect to the second link about a third pivot point, and
in response to the thrust reverser moving from a stowed position to a deployed position, the first reverser door rotates about the first pivot point, the second reverser door rotates about the first pivot point, and the first pivot point moves aft with respect to the frame, and
the fourth pivot point is a fixed pivot point.

* * * * *